US008555755B2

(12) United States Patent
Cattaneo

(10) Patent No.: US 8,555,755 B2
(45) Date of Patent: Oct. 15, 2013

(54) FASTENING APPARATUS WITH INTERCHANGEABLE PROGRAMMABLE INSERTS

(75) Inventor: Massimiliano Cattaneo, Carate Brianza (IT)

(73) Assignee: Atlas Copco BLM S.R.L., Paderno Dugnano (MI) (IT)

( * ) Notice: Subject to any disclaimer, the term of this patent is extended or adjusted under 35 U.S.C. 154(b) by 208 days.

(21) Appl. No.: 12/998,066

(22) PCT Filed: Sep. 21, 2009

(86) PCT No.: PCT/IB2009/006268
§ 371 (c)(1),
(2), (4) Date: May 25, 2011

(87) PCT Pub. No.: WO2010/035084
PCT Pub. Date: Apr. 1, 2010

(65) Prior Publication Data
US 2011/0303054 A1 Dec. 15, 2011

(30) Foreign Application Priority Data
Sep. 23, 2008 (IT) .............................. MI2008A1688

(51) Int. Cl.
*B25B 23/142* (2006.01)
*B23P 19/06* (2006.01)

(52) U.S. Cl.
USPC .................................. 81/479; 81/467; 73/761

(58) Field of Classification Search
USPC ......................... 81/467, 469, 479; 29/407.02; 73/862.21–862.27, 761
See application file for complete search history.

(56) References Cited

U.S. PATENT DOCUMENTS

| | | | | |
|---|---|---|---|---|
| 5,014,794 A * | 5/1991 | Hansson | ....................... | 173/181 |
| 6,167,788 B1 * | 1/2001 | Schonberger et al. | .......... | 81/467 |
| 6,234,051 B1 * | 5/2001 | Bareggi | .......................... | 81/479 |
| 6,390,205 B2 * | 5/2002 | Wallgren et al. | .................. | 173/2 |
| 6,405,598 B1 * | 6/2002 | Bareggi | .......................... | 73/761 |
| 7,082,866 B2 * | 8/2006 | Becker | ............................ | 81/479 |
| 7,469,619 B2 * | 12/2008 | Anjanappa et al. | ............ | 81/479 |
| 2011/0100170 A1 * | 5/2011 | Chiapuzzi | ....................... | 81/479 |

FOREIGN PATENT DOCUMENTS

| | | |
|---|---|---|
| DE | 39 22 049 A1 | 1/1990 |
| EP | 1 060 844 A | 12/2000 |
| EP | 1 068 931 A | 1/2001 |
| WO | WO 00/45997 A | 8/2000 |

OTHER PUBLICATIONS

PCT Search Report dated Jan. 26, 2010.

* cited by examiner

*Primary Examiner* — David B Thomas
(74) *Attorney, Agent, or Firm* — Hedman & Costigan, P.C.; James V. Costigan; Kathleen A. Costigan

(57) ABSTRACT

An electronic apparatus for controlled fastening, comprises a body (11) coupled to which is one of different removable inserts (17, 17', 17"). The insert comprises a transponder (18) which sends setting signals to the apparatus when it is mounted on the apparatus. The apparatus in turn comprises transmission means for programming into the transponder (18) information which shall be inserted into the signals which shall subsequently be sent by the transponder to the apparatus.

9 Claims, 1 Drawing Sheet

FASTENING APPARATUS WITH INTERCHANGEABLE PROGRAMMABLE INSERTS

The present invention refers to electronic apparatuses for controlled fastening of mechanical members.

In the prior art, fastening apparatuses are known comprising a body, containing the various control and possibly actuation members coupled to which is one of different removable inserts, each of which is intended to be engaged with a corresponding type of mechanical member (for example, a screw head, with a male or female coupling) on which the apparatus is intended to operate.

Such electronic apparatuses comprise sensors, amongst which is a torque sensor, for detecting the torque exerted onto the mechanical member and other involved magnitudes, so as to allow a controlled fastening of the mechanical member through suitable processing means which show the worker various involved parameters and possibly, control the carrying out of the fastening operation.

Since the operative parameters often depend on the specific insert used on the apparatus, inserts have been proposed equipped with an identification code which is automatically detected by the apparatus to control the setting of the operation parameters. EP 1060844 describes apparatuses in which the inserts are equipped with a transponder that is activated by the insert on the apparatus. Each transponder transmits a unique identification code which is read by the apparatus. This allows the apparatus to be set according to preset settings associated with the insert identified with that code.

Of course, all the setting data for the various inserts must be stored in the apparatus, so that the apparatus is able to find the correct parameters when it detects the identification code of the particular insert. In the case in which the insert needs replacing with an identical one, because it is either worn-out or broken, it is necessary to ask the manufacturer to provide a new insert with the same code as the insert to be replaced, in order to avoid having to program the tools again. This can lead to management problems, especially in the case in which the insert is used with a certain number of tools. However, when a new type of insert is desired to be used, all the tools must be reprogrammed because of its specific identification code. It has also been proposed for the transponder to directly contain apparatus parameter setting data, but such data must have already been stored in the transponder, usually by the manufacturer and with special equipment. This leads to even greater problems than having the single identification code in the transponder. Moreover, there is no relationship between the parameters in the insert and the apparatus-insert coupling.

The general purpose of the present invention is to avoid the aforementioned drawbacks, by providing an innovative apparatus with interchangeable inserts which allows, for example, a more efficient management and increased flexibility of use. A further purpose is to allow a quick and easy setting of correction parameters of the measurements carried out by the apparatus depending on the insert applied onto it, so as to, for example, compensate for measurement errors due to the coupling of the apparatus with the specific insert.

In view of such a purpose it has been thought to make, according to the invention, an electronic apparatus for controlled fastening, comprising a body coupled to which is one of different removable inserts, each of which is intended to be engaged onto a corresponding type of mechanical member on which the apparatus is intended to operate, and also comprising a sensor for detecting the torque exerted onto the mechanical member which emits an information signal transmitted to calculation means to obtain significant parameters of the action of the apparatus on the mechanical member from the sensor signal, mounted on each insert being a transponder which, when activated, sends signals and present in the body being reception means for receiving such signals transmitted by the transponder of the insert coupled with the body and for sending them to the calculation means to influence the calculation of said significant parameters for the operation of the apparatus and/or to provide control for presets of operating parameters of the apparatus, characterized in that it comprises, in the body, also means to send programming information signals to the transponder and in that the transponder comprises means for receiving such signals and for storing them in its memory as part of signals to be transmitted.

Again according to the invention it has been thought to make a setting method, depending on the inserted insert, of an electronic apparatus for controlled fastening with interchangeable inserts provided with a transponder, comprising: a first preparation step in which the insert is mounted on the apparatus and the apparatus stores the desired setting parameters in the transponder held in the insert; a subsequent employment step in which when mounting an insert on the apparatus stored in which are the setting parameters, the transponder in the insert transmits the stored parameters to the apparatus in such a manner that they are used by the apparatus with that specific insert.

In order to clarify the explanation of the innovative principles of the present invention together with its advantages with respect to the prior art, hereafter, with the help of the attached drawings, we shall describe a possible embodiment given as an example applying such principles. In the drawings.

Figure 1:
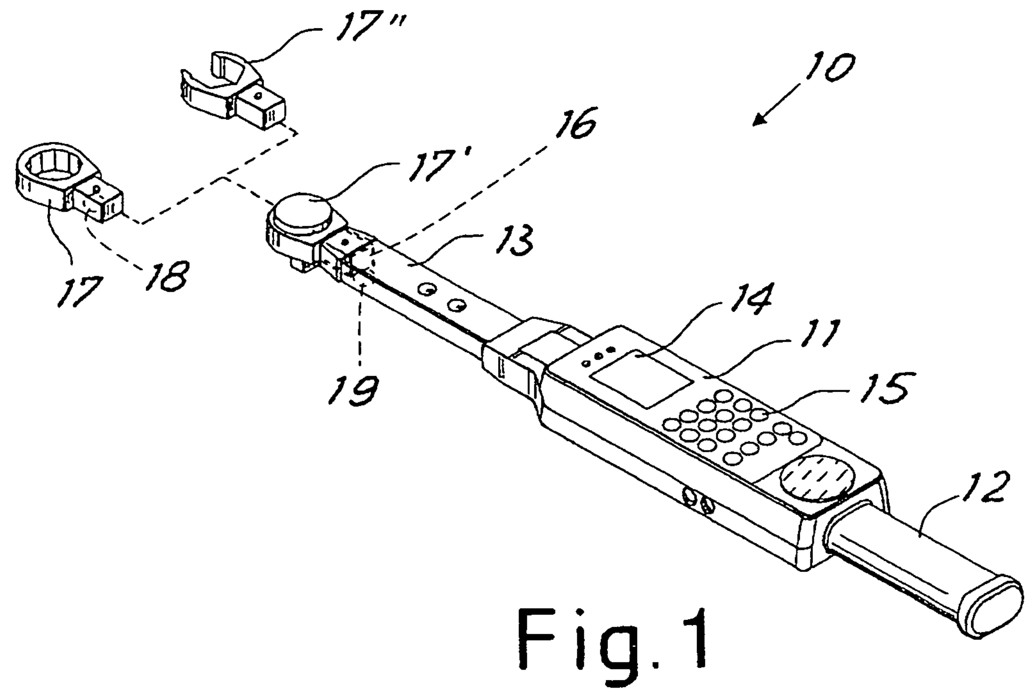
FIG. 1 represents a schematic perspective view of an electronic apparatus according to the invention.

With reference to the figures, FIG. 1 shows an electronic apparatus for controlled fastening, made according to the invention, in the form of a manual torque wrench, wholly indicated with reference numeral 10. The wrench comprises a body 11, containing the control circuits and the processing unit of the wrench, and comprising a handling grip 12 (advantageously containing rechargeable batteries for supplying power to the wrench) on one side, and an arm 13 on the other side. On the body 11 a display 14 is advantageously present for visualizing information and operating data. A keypad 15 allows data and commands to be inserted.

Of course, it is implied that in the case in which processing or storing data requires a unit which is not easily or not completely able to be contained in the body 11, the body 11 can be connected, through a cable or a wireless connection, to external processing units. A cabled connection can also be foreseen to provide an external power supply.

In a suitable seat 16 at the end of the arm 13 a plurality of inserts 17, 17', 17" can alternatively be inserted. For example, each insert will be suitable for engaging the wrench with a corresponding type and/or size of mechanical member or element (screw, nut, etc.) on which the apparatus is intended to operate.

Although for the sake of simplicity inserts are shown all having similar size, extendible inserts or inserts with particular shaped arms can also be foreseen, as it is known in the field.

Each insert comprises a transponder 18 (indicated for example, with a dashed line in the insert 17) inside of it in a suitable position (typically in the insertion shank to the seat 16) to be coupled with a suitable antenna 19 near to the seat 16 when it is mounted on the apparatus.

The methods of coupling between the transponder and the antenna to activate the transponder (usually known as “tags”) and to communicate are widely known and shall therefore not be described in detail hereafter.

The wrench also comprises a known sensor (for example made with a bending sensor arranged in the arm 13) to detect the torque exerted on the mechanical member. Advantageously, a similarly known sensor can also be foreseen (for example a gyro sensor) to detect the fastening angle. Such sensors are indicated with 20 and 21, respectively, in the chart of FIG. 2.

Figure 2:
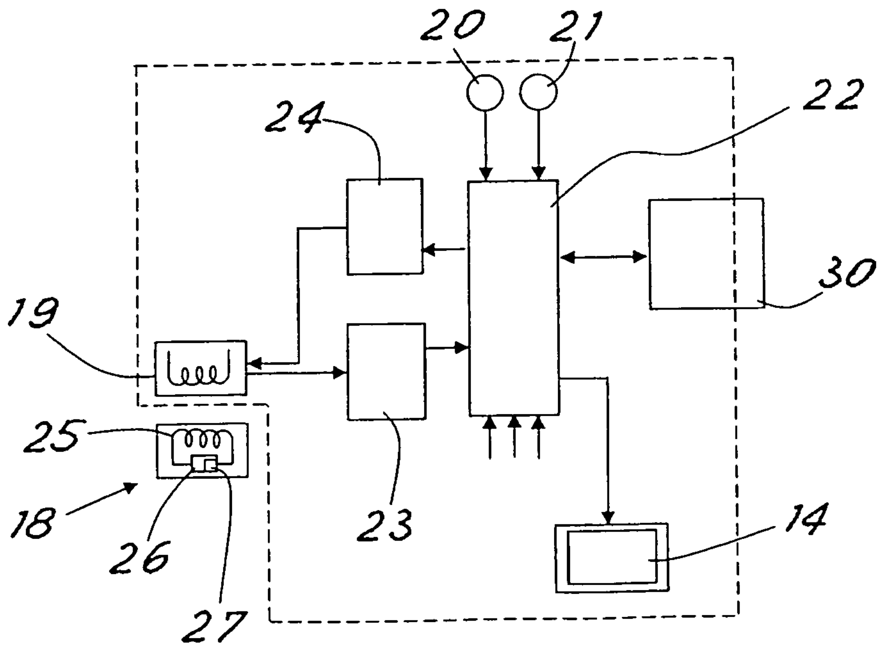
FIG. 2 represents a block circuit diagram of the apparatus of FIG. 1.

As can be seen in FIG. 2, the torque sensor 20 and, if present, the angle sensor 21, emit information signals which are transmitted to calculation means 22 to obtain, from the sensor signal, significant parameters of the action of the apparatus on the mechanical member. The results are generally sent to the display 14 and shown on it to guide the worker to carry out the screwing with respect to the parameters required, as can easily be imagined by a man skilled in the art. The calculation means can advantageously be made with a suitably programmed microprocessor circuit. The results of the processing and possibly other data and information can be exchanged between the calculation means and a control unit 30 of the apparatus. Such a control unit can also be partially or totally external of the apparatus if desired or needed and it can also be part of a more extensive electronic apparatus management network.

The antenna 19 and a suitable reception unit 23 form the means for receiving the signal of the transponder, so as to receive the signal from the transponder, extract the information and send it to the calculation means 22. The calculation means use the information sent by the transponder to influence the calculation of the significant parameters for the operation of the apparatus and/or to provide control for presets of operating parameters of the apparatus. The transponder can send a unique identification code for the insert inserted and/or setting data of the parameters required for the screwing (maximum torque, angle, etc.) so that the calculation means may calculate and show the worker the correct data on the display.

The apparatus is also equipped with transmission means comprising a suitable transmitter 24, advantageously using the same antenna 19. Alternatively, a separate transmission antenna can however be foreseen suitably arranged to communicate with the transponder in the insert coupled with the apparatus. The transmitter and receiver can also be coupled in a single transceiver circuit.

Such transmission means are suitable for sending information programming signals to the transponder and the transponder in turn comprises means for receiving such signals and means for storing them in a memory as part of the signals to be sent.

In order to receive and transmit the signals, the transponder is equipped with its own antenna 25 and a control circuit 26 with a writeable memory 27 so as to store the data to be transmitted. The structure of such a type of transponder is of the per se known type and shall not be further shown or described hereafter.

The transmitted signals can comprise an identification code of the mounted insert, so that the tool can be set according to parameters stored inside it and associated with such an identification code. In the case in which it is necessary to copy the identification code onto a new insert, it is possible to control the tool to receive the code from the old insert and to store it, to then replace the insert with the one to be programmed, and control the tool so that it transmits the code to be stored to the transponder of the new insert. It is also possible to store a new code by directly programming it in the tool through the keypad or by making the tool generate it (for example, through a software routine which ensures the automatic creation of a unique code).

The programming information signals can also be more complex, increasing the flexibility of use of the apparatus even further. For example, it has advantageously been found that the means for sending programming information signals to the transponder are connected to the calculation means to receive and store, in the memory of an insert, those operation parameters which are obtained by the calculation means according to information signals emitted by the torque detection sensor and/or by the angle sensor, if present.

In such a way it is possible to directly store settings or data obtained through using the same tool, in the insert. This allows correction coefficients of the information signals emitted by the sensor for detecting the torque or the angle of the apparatus to be inserted into the signals transmitted by the insert, so that it is possible, for example, to correct the parameters calculated by the calculation unit of the apparatus according to the differences that the use of the particular insert produces between measured size and actual size.

With an apparatus according to the invention it is possible to carry out a method for setting the apparatus depending on the inserted insert, which comprises a first preparation step in which the insert is mounted on the apparatus and the apparatus stores setting parameters in the transponder contained in the insert and a subsequent employment step in which when mounting an insert in which the setting parameters have been stored on the apparatus, the transponder in the insert transmits the stored parameters to the apparatus so that the apparatus can use them with that specific insert during its use.

In particular, it is advantageous for the calculation means in the apparatus to receive the setting parameters previously stored so that during the use of the apparatus with that insert, the calculation means can use such setting parameters to influence the calculation of the significant parameters for the operation of the apparatus and/or to provide control for presets of operating parameters of the apparatus. For example, the apparatus can store variation values (produced by the configuration of the insert or by the use of extensions) of the arm for applying the force which generates the measured torque, in the insert. Flexing values of the apparatus or of the insert can also be stored, which alter the actual rotation angle with respect to what has been measured by the angle sensor.

Advantageously, the preparation step can comprise the process of mounting the particular insert onto the apparatus and then use the apparatus in preset test conditions (for example, through a test bench or through a preset use of the apparatus), making the apparatus detect and calculate significant parameters of the action of the apparatus undergoing the test conditions. The apparatus can thus store the setting parameters which are calculated depending on the differences between the significant parameters detected by the apparatus and the significant parameters expected with the applied testing conditions, in the transponder contained in the insert. For example, by applying a known preset torque, the apparatus can store in the insert a value correction parameter of the value which is measured by the sensor, so as to eliminate the measurement errors caused by coupling the apparatus with the particular insert. This can similarly be foreseen for the angle measurements.

At this point it is clear how the predetermined purposes have been reached, by providing an electronic fastening apparatus having a high flexibility and which is very practical to use thanks to the possibility of saving information itself directly inside the inserts it uses and that are then transmitted back during the use of that specific insert. Every insert can be programmed easily to correct the parameters detected and calculated by the apparatus with that specific insert. It is thus possible to eliminate, for example, errors due to inserts equipped with an extension which alters the arm for applying the fastening force and/or the rotation angle.

It is no longer even necessary for the insert manufacturer to produce inserts with specific codes when ordered. This makes the storage in the warehouse and managing the orders easier.

Of course, the description above of an embodiment applying the innovative principles of the present invention is given as an example of such innovative principles and must therefore not be taken to limit the scope of protection claimed hereby. For example, the apparatus can have a different shape from that shown and can also be of the motorized type for a not completely manual fastening operation. The values to be stored in the memory of the transponder can also be sent to the apparatus through an external connection to a control device, for example a personal computer with suitable apparatus managing software.

The invention claimed is:

1. Electronic apparatus for controlled fastening, comprising a body (11) coupled to which is one of different removable inserts (17, 17', 17"), each of which is intended to be engaged onto a corresponding type of mechanical member on which the apparatus is intended to operate, and further comprising a sensor (20) for detecting a torque exerted onto the mechanical member and which emits an information signal transmitted to calculation, means (22) to obtain, from the signal emitted by the sensor, significant parameters of an action of the apparatus on the mechanical member, mounted on each insert being a transponder (18) which, when activated, sends signals and present in the body being reception means (19, 23) for receiving such signals transmitted by the transponder of the insert coupled to the body and sending them to the calculation means (22) to influence calculation of said significant parameters for the operation of the apparatus and/or to provide control for presets of operating parameters of the apparatus, the apparatus further comprising in the body, means (19, 24) for sending programming information signals to the transponder (18) and the transponder comprising means (25, 26) for receiving such signals and storing them in its memory (27) as part of signals to be transmitted, characterized in that the means (19,24) for sending programming information signals to the transponder (18) are connected to the calculation means (22) for receiving operative parameters obtained by the calculation means (22) according to the information signals emitted by the torque detection sensor (20), sending such operative parameters to the insert (17) and storing them in a memory (27) thereof.

2. Apparatus according to claim 1, characterized in that the signals comprise an insert identification code.

3. Apparatus according to claim 1, characterized in that the signals comprise coefficients for correcting the information signals emitted by the torque detection sensor (20).

4. Apparatus according to claim 1, characterized in that it comprises a rotation angle sensor (21) capable of emitting angle information signals towards the calculation means and in that the signals sent by the insert comprise coefficients for correcting the information signals emitted by the angle sensor.

5. Apparatus according to claim 1, characterized in that the apparatus is in the form of a manually controlled electronic fastening wrench and the significant parameters are shown on a display (14) on the wrench.

6. Method for setting, depending on the inserted insert, an electronic fastening apparatus for controlled fastening with interchangeable inserts provided with a transponder, comprising:

a first preparation step wherein the insert is mounted on the apparatus and the apparatus stores desired setting parameters in the transponder held in the insert;

a subsequent employment step wherein, when an insert in which the setting parameters are stored is mounted on the apparatus, the transponder in the insert transmits the stored parameters to the apparatus in such a manner that they are used by the apparatus during the use with that specific insert.

7. Method according to claim 6, wherein in the employment step the parameters transmitted by the transponder are sent to calculation means in the apparatus to use them, when using the apparatus with that insert, to influence the calculation of significant parameters for the operation of the apparatus and/or to provide control for the presets of operating parameters of the apparatus.

8. Method according to claim 6, wherein in the preparation step, after mounting the insert on the apparatus, the apparatus is used in preset test conditions, controlling the detection and calculation—by the apparatus—of the significant parameters of the action of the apparatus subjected to the test conditions, the apparatus storing in the transponder held in the insert setting parameters calculated according to the differences between the significant parameters detected by the apparatus and the significant parameters expected with the test conditions applied.

9. Method according to claim 6, wherein the setting parameters stored by the apparatus in the transponder of the insert during the preparation step comprise a code for identifying the specific insert and/or the significant parameters detected by the apparatus comprise torque and/or fastening angle information.

* * * * *